United States Patent [19]

Covington et al.

[11] Patent Number: 4,889,717

[45] Date of Patent: Dec. 26, 1989

[54] BARRIER MATERIAL FOR GEL SEALANT-CABLE JACKET INTERFACE

[75] Inventors: Anne E. Covington, Apex; Thomas A. Hunter, Cary; Keith Dawes, Raleigh, all of N.C.

[73] Assignee: Raychem Corporation, Menlo Park, Calif.

[21] Appl. No.: 184,469

[22] Filed: Apr. 21, 1988

Related U.S. Application Data

[63] Continuation-in-part of Ser. No. 37,747, Apr. 13, 1987, abandoned.

[51] Int. Cl.$^4$ .............................................. B32B 3/26
[52] U.S. Cl. .................................. 428/304.4; 156/48; 174/84 R; 174/110 F; 428/269; 428/314.4
[58] Field of Search ...................... 156/48, 49, 52, 53, 156/56; 174/84 R, 110 F; 428/269, 304.4, 308.4, 314.4, 314.8

[56] References Cited

U.S. PATENT DOCUMENTS

| | | | |
|---|---|---|---|
| 4,466,843 | 8/1984 | Shimirak | 156/48 |
| 4,643,924 | 2/1987 | Uken et al. | 428/35 |
| 4,695,676 | 9/1987 | Lawrence et al. | 174/22 R |

*Primary Examiner*—William J. Van Balen
*Attorney, Agent, or Firm*—A. Stephen Zavell; Herbert G. Burkard

[57] ABSTRACT

This invention provides a foam barrier which prevents substantial migration of plasticizer from a plasticized polymeric article, such as a PVC cable jacket, into a gel sealing material in contact with the article and prevents substantial migration of oil from the gel material into the article while not significantly interfering with the sealing contact between the gel material and the surface of the article.

9 Claims, No Drawings

BARRIER MATERIAL FOR GEL SEALANT-CABLE JACKET INTERFACE

This application is a continuation-in-part of application Ser. No. 037,747, filed Apr. 13, 1987, now abandoned.

FIELD OF THE INVENTION

This invention relates to the use of gel sealing materials on an exterior surface of plasticized polymeric articles, such as PVC cable jackets.

BACKGROUND OF THE INVENTION

Gel materials have been used in splice cases for sealing the external surface of cable jackets to prevent moisture and other environmental elements from entering the splice case. For example, gel seals are used where a cable enters or exits a splice case closure. Such a gel seal and splice case closure is disclosed in copending application U.S. Ser. No. 698,643 filed Feb. 6, 1985, now abandoned, the disclosure of which is incorporated herein by reference. The gel materials useful in forming such seals are described in U.S. Pat. Nos. 4,600,261 to Debbaut; 4,634,207 to Debbaut; 4,595,635 to Dubrow et al., and copending applications U.S. Ser. No. 507,433 filed June 26, 1983, U.S. Ser. No. 730,697 filed May 2, 1985, now U.S. Pat. No. 4,701,574 U.S. Ser. No. 801,018 filed Nov. 22, 1985, now U.S. Pat. No. 4,716,183 and U.K. Ser. No. 8617559 filed July 18, 1986, the disclosures of which patents and applications are incorporated herein by reference.

The gel materials useful in sealing cable jackets and other plasticized polymeric articles have a cone penetration value from about 50 to about 350 $(mm^{-1})$ and an ultimate elongation of at least about 100%, which cone penetration and ultimate elongation are determined according to standard ASTM tests D217 and D638, respectively, as set forth in the above referenced patents and applications incorporated herein by reference. These gel materials in general comprise a polymeric component which constitutes up to about 50% of the gel and an oil material which is at least about 50% of the gel by weight, such as mineral oil, hydrocarbon oil, silicone oil and the like, depending on the polymeric structure present in the gel material. Preferably these gel materials contain at least about 70% oil and up to about 30% polymer and in many cases contain more than 80% oil and less than about 20% polymer.

In some instances when these gel materials are used on the surfaces of plasticized polymeric articles such as the plastic jackets on telecommunication cables, which are PVC jackets, it has been observed that either the plasticizer present in the plastic article migrates into the gel or the oil component of the gel migrates into the plastic article, or in some instances both occur. Such migration causes detrimental changes in properties of the polymeric article and could be prevented by placing an impervious film between the gel material and the polymeric article, such as an aluminum foil or other impervious material which would prevent the oils in the gels and the plasticizers in the plastic articles from migrating. However, when such a layer is interposed between the gel and the surface of the plastic article, the advantages of using the gel sealing material are lost, for example conformance of the gel and flexibility are impaired using such simple films. The gel sealing material is used because it forms a superior seal to the surface of the polymeric article, such as a cable jacket, because of the softness, conformability and other surface properties of the gel which forms the superior seal to prevent water and other environmental contaminants from entering a splice case or other closure through the interface between the gel seal and the polymeric article.

Therefore, it is an object of this invention to select a barrier material which prevents the migration of the oil from the gel and the migration of the plasticizer from the polymeric article, but which allows the beneficial physical properties of a gel to be retained.

SUMMARY OF THE INVENTION

In one aspect this invention provides an assembly comprising a plasticized polymeric article, a gel material adjacent a surface of said polymeric article and a foam barrier disposed as a layer between said article and said gel material for substantially preventing migration of plasticizer from said article into said gel material and preferably also substantially preventing migration of oil from said gel material.

In another aspect this invention provides a shaped gel article for sealing against a surface of a plasticized polymeric article and having disposed on a surface of the shaped gel article intended for sealing said surface of the polymeric article a foam barrier disposed as a layer on the surface of the shaped gel article for substantially preventing migration of plasticizer from said article into said gel material and preferably also substantially preventing migration of oil from the gel material.

In another aspect this invention provides a method of substantially preventing migration of plasticizer from a plasticized polymeric article and preferably also substantially preventing migration of oil from a gel material adjacent said polymeric article, which comprises interposing between the article and the gel material a foam barrier which substantially prevents such migration of plasticizer and preferably such migration of oil.

The barrier material useful in this invention must be a foam (particularly a closed cell foam, examples of which are given below) so that it does not prevent the gel material from sealing to the surface of the polymeric article. However, it must be capable of preventing the migration of plasticizer from the polymeric article into the gel or into itself and prevent the migration of oil from the gel into the polymeric article at least to the extent that after a six-day, 80° C. contact as described below the needle hardness of the polymeric article decreases no more than about 60%, preferably no more than about 50%, and most preferably no more than about 35%. The barrier materials are preferably nitrile foams or polyester foams.

In order to illustrate the barrier materials useful in the assembly, combination and method of this invention, the following materials shown in Table 1 were placed between a Raychem "K-Gel" material prepared with accordance with copending application U.S. Ser. No. 801,018 filed Nov. 22, 1985, now U.S. Pat. No. 4,716,183 formed into the end piece of a splice closure for a telephone cable in accordance with copending application U.S. Ser. No. 698,643 filed Feb. 6, 1985 now abandoned. The gel end pieces and the splice closure were placed around an AT&T 25 pair inside telephone cable having a PVC installation external jacket. Each example was aged six days at 80° C. then the needle hardness of the PVC jacket on the cable was measured.

TABLE 1

This table shows the needle hardness of PVC cable insulation after wrapping the specified barrier material around an AT&T 25 pair inside telephone cable and inserting the cable into a Raychem TRAC ® splice closure with K-GEL end pieces and aging the samples six days at 80° C.

| Barrier Material | Needle hardness (0.1 mm) of PVC cable jacket after 6 days, 80° C. (150 gms on needle). |
| --- | --- |
| Control; Cable jacket with no K-Gel contact | 5.5 ± 0.5 |
| Control; Cable jacket with K-Gel contact, no barrier material | 0.6 ± 0.5 |
| Silicone foam | 1.8 ± 0.8 |
| Neoprene foam | 0.2 ± 0.4 |
| BUNA-N nitrile foam (from CRG Company, manufactured by Goodrich or Uniroyal) | 4.6 ± 0.5 |
| "Diaper tape" open mesh plastic tape in general use in the telephone cable maintenance industry | 2.4 ± 0.5 |
| 3M polyester foam (from Minnesota Mining & Manufacturing Company) | 3.2 ± 0.8 |
| Epichlorohydrin foam | 0.6 ± 0.5 * Note 1 |
| S1076 Mastic (Raychem Corp.) | 0 * Note 2 |
| S1175 Mastic (Raychem Corp.) | 0.2 ± 0.4 * Note 1 |
| S1189 Mastic (Raychem Corp.) | 0.4 ± 0.5 |
| S1225 Mastic (Raychem Corp.) | 0.4 ± 0.5 |
| Geltek ® Strip GTS-1500 (Raychem Corp.) | 0.4 ± 0.5 * Note 3 |
| Geltek ® Strip GTS-1120 (Raychem Corp.) | 0.6 ± 0.5 * Note 3 |

Note 1: Slight brown discoloration of PVC insulation
Note 2: Mastic deteriorates, forming oily layer on PVC.
Note 3: Oily interface forms between barrier and PVC. The Geltek strip is a silicone gel strip as disclosed in U.S. Pat. No. 4,595,635

What is claimed is:

1. An assembly comprising a plasticized polymeric article, a gel material adjacent a surface of said polymeric article and a foam barrier disposed as a layer between said article and said gel material for substantially preventing migration of plasticizer from said article into said gel material.

2. An assembly according to claim 1 wherein the article is a cable jacket and the barrier means is a nitrile foam.

3. An assembly according to claim 1 wherein the article is a cable jacket and the barrier material limits any decrease in needle hardness of the article upon contact with the gel material for six days at 80° C. to less than about 60%.

4. A combination of shaped gel article for sealing against a surface of a plasticized polymeric article and having disposed on a surface of the shaped gel article intended for sealing said surface of the polymeric article a foam barrier disposed as a layer on the surface of the shaped gel article for substantially preventing migration of plasticizer from said article into said gel material 5. A combination according to claim 4 wherein the article is a cable jacket and the barrier means is a nitrile foam.

6. A combination according to claim 4 wherein the article is a cable jacket and the barrier material limits any decrease in needle hardness of the article upon contact with the gel material for six days at 80° C. to less than about 60%.

7. A method of substantially preventing migration of plasticizer from a plasticized polymeric article into a gel material adjacent said article which comprises interposing between the article and the gel material a foam barrier which substantially prevents such migration of plasticizer into said gel material.

8. A method according to claim 7 wherein the article is a cable jacket and the barrier means is a nitrile foam.

9. A method according to claim 7 wherein the article is a cable jacket and the barrier material limits any decrease in needle hardness of the article upon contact with the gel material for six days at 80° C. to less than about 60%.

* * * * *